A. BAUMANN.
OPTICAL INSTRUMENT.
APPLICATION FILED JULY 28, 1919.

1,397,156.

Patented Nov. 15, 1921.

Inventor:—
Alfred Baumann
by
his attorney

UNITED STATES PATENT OFFICE.

ALFRED BAUMANN, OF CASSEL, GERMANY.

OPTICAL INSTRUMENT.

1,397,156.     Specification of Letters Patent.     Patented Nov. 15, 1921.

Application filed July 28, 1919. Serial No. 313,961.

*To all whom it may concern:*

Be it known that I, ALFRED BAUMANN, a citizen of Germany, and residing at Cassel, Germany, have invented certain new and useful Improvements in Optical Instruments, of which the following is a specificatiton.

The present invention has reference to certain new and useful improvements in optical instruments and relates more particularly to improvements in telescopes, opera glasses, field glasses and the like having a set of prisms, for instance of the crossed Porro type for each eye piece.

In prior prism monocles or binocles there are used tubular cylindrical members for seating at their opposite extremities the ocular and objective mounts and for also housing the prisms. These two cylinders are connected by one or more hinges, in the case of a binocular, and tend to render the instrument rather bulky and awkward to handle. According to the present invention these tubular lens-supporting members are dispensed with and there is provided only a single hinge the two leaves of which are in the shape of plates and respectively support the objective and ocular tubes, as also the prisms, thus doing away also with special prism seats.

By judicious arrangement of objective, ocular and prisms, that is to say by making the picture plane coincide with the prism face opposite the ocular, on the one hand the ocular diaphragm becomes also the first prism diaphragm, and on the other hand the intermediate ocular tube between diaphragm and prism is dispensed with. There is thus required but a single diaphragm in place of the two used in prior constructions. The annoying reflections emanating from the inner surfaces of the walls of the intermediate supporting tubes of prior makes of telescopes are thus effectively got rid of. The proposed mechanical arrangement calls but for small caps or hoods to be placed over the prisms for their protecttion. The construction of the instrument thus is greatly simplified and its weight, especially if a suitable light material is used, is so reduced that the instrument can readily be supported for extended use by means of a suitable head support.

Since the use of special prism seats is dispensed with and the prisms can readily be displaced for adjustment purposes on the apertured support plates, either by themselves or together with their caps, a very simple adjusting arrangement may be resorted to.

Figure 1:
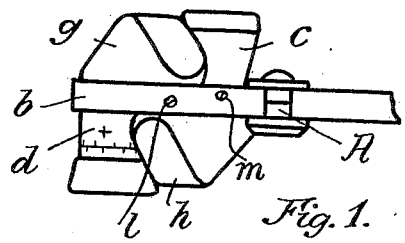
Figure 2:
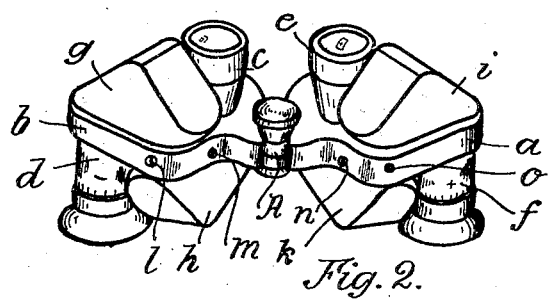

In order to make my inventiton more readily understood, I will now describe it in detail in connection with the accompanying drawing, in which Figure 1 represents a side view of the one half of my improved binocular, of which Fig. 2 is a perspective view.

The skeleton or supporting body of the instrument, in the case of a binocle, consists of the joint connection A and the two leaves in the shape of suitably contoured and apertured plates $a$ and $b$ respectively. These latter plates serve as a support to which the mechanical and optical parts are directly secured, such as the tubes or mounts $d$ and $f$ for the two objectives and the tubes or mounts $c$ and $e$ for the oculars, also the hoods of caps $g$, $h$, $i$ and $k$ for the respective prisms, which latter are not visible but are of substantially the same conformation as that shown by these caps with a certain amount of clearance between to allow of a limited displacement of the prisms relative to their caps. In the case of crossed Porroprisms the arrangement of parts is such that the hypotenuse faces of the prisms substantially coincide with the middle plane of the supporting plate.

For securing and adjusting the prisms in their plate relative to the respective cap there are provided the screws $l$, $m$, $n$ and $o$, which in the direction of required displacement of the prisms face each other in pairs and bear against the catheti faces of the prisms and thereby prevent angular displacement thereof. The prisms can easily be cleaned and adjusted by simply removing the caps.

Obviously, I may also use my lens and prism supporting plate arrangement to the same advantage in a monocular eye glass.

What I claim is:—

1. In an optical instrument of the character set forth, in combination, an apertured supporting plate, an ocular, prisms, an objective, and a separate protective cap for each of said prisms, all directly mounted upon said supporting plate.

2. In an optical instrument of the character set forth, in combination, an apertured supporting plate, and an ocular, prisms, and an objective, and protective caps of substantially the shape of the underlying prisms, and means for independently displacing said prisms relative to their caps.

3. In an optical instrument, of the character set forth, in combination, an apertured supporting plate, and an ocular, prisms, an objective and protective caps for said prisms, all directly mounted upon said supporting plate, and means for adjusting the relative position of said prisms, comprising set screws operatively mounted in said supporting plate and acting in pairs on the catheti of said prisms in a direction parallel to the direction of displacement.

ALFRED BAUMANN.